G. E. TITCOMB.
FRICTION CLUTCH.
APPLICATION FILED OCT. 24, 1906.

932,356.

Patented Aug. 24, 1909.

Witnesses:

Inventor
George E. Titcomb.
by his Attorneys
Howson & Howson

UNITED STATES PATENT OFFICE.

GEORGE E. TITCOMB, OF PHILADELPHIA, PENNSYLVANIA, ASSIGNOR TO THE DODGE COAL STORAGE COMPANY, OF NAUGATUCK, CONNECTICUT, A CORPORATION OF CONNECTICUT.

FRICTION-CLUTCH.

932,356.

Specification of Letters Patent.

Patented Aug. 24, 1909.

Application filed October 24, 1906. Serial No. 340,352.

*To all whom it may concern:*

Be it known that I, GEORGE E. TITCOMB, a citizen of the United States, residing in Philadelphia, Pennsylvania, have invented certain Improvements in Friction-Clutches, of which the following is a specification.

My invention relates to certain improvements in band friction clutches.

The object of my invention is to arrange means for compensating for the wear of the friction blocks so that the pivot of the band will always bear the same relation to the clutch no matter how the blocks are worn.

Figure 1:
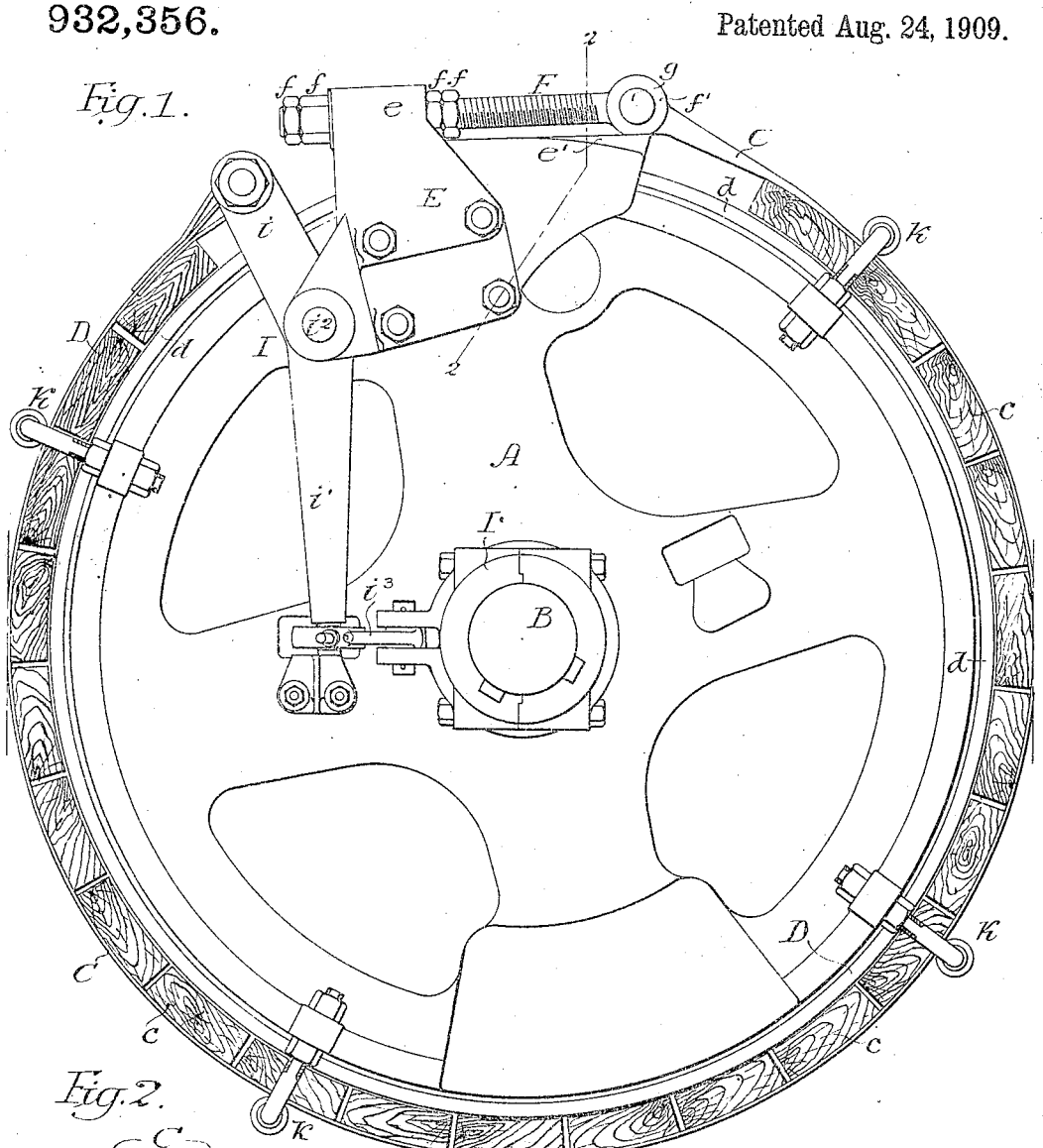
Figure 2:
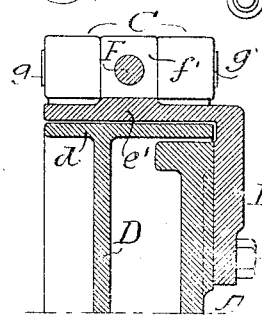
Figure 3:
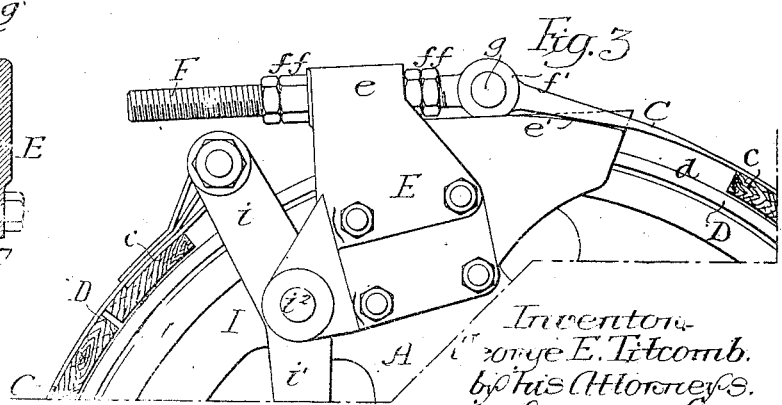

In the accompanying drawings:—Figure 1, is a side view illustrating my improvements; Fig. 2, is a section on the line 2—2, Fig. 1; and Fig. 3, is a view of a portion of Fig. 1, showing the parts in position when the blocks are worn away.

A is a carrier mounted on a shaft B, C is a friction band supported by the carrier and in the present instance is provided with friction blocks c. These blocks may be of wood or other suitable material.

D is a flanged element in the form of a wheel or drum having a wide flange d which is engaged by the blocks c of the band C. Secured to the carrier A is a bracket E having a bearing e for the screw bolt F which is adjustably mounted in the bearing e and secured in the adjusted position by nuts f, f. The bolt F has an eye f' through which passes a pin g, the pin also passes through an eye at the fixed end of the band C. On the bracket E is a platform e' and the eye f' of the bolt F is preferably flattened so as to travel on this platform.

It will be noticed that the bolt F is not in line with the direction of pull of the band C as is usual, but is arranged at an angle to the line of pull, the side strain being taken by the platform e' so as to resist the tendency to deflect the bolt, when it is desired to take up the slack due to the wearing away of the friction blocks c the pin g carried by the bolt F is moved toward the center of the carrier A a distance equal to the wear on the blocks so that the pivot pin g will always bear the same relation to the band. In the present instance, the opposite end of the band C is secured to one arm i of a lever I pivoted at $i^2$ to the bracket E, the other arm i' being connected to the operating sleeve I' by a link $i^3$, so that when the sleeve is moved longitudinally on the shaft the lever will cause the band to grip the flange d of the wheel or drum D.

k, k are rollers tending to keep the band in the normal position; these rollers form no part of the present invention.

In some instances the blocks c may be omitted and a band of any suitable material or of any construction may bear directly upon the wheel D, but in most cases the block construction as shown is preferable.

I claim:—

1. The combination in a band friction clutch, of a carrier, a flanged element, a friction band mounted on the outside surface thereof, means for causing the band to grip the flanged element, a bolt mounted on the carrier and attached to the band, and a platform on the carrier placed to prevent radial movement of the end of the bolt where it is attached to the band, when said band grips the flanged element.

2. The combination in a band friction clutch of a carrier, a friction band, a flanged element carrying said band upon its outside surface, means for clamping the band to said flanged element, a bolt mounted on the carrier and attached to the band, means for supporting the bolt so that it extends at an angle to the line of strain of the band, and a platform situated so as to resist the tendency to deflect the bolt when tension is applied to the band.

3. The combination in a band friction clutch, of a carrier, a friction band, a flanged element extending within said band, means for clamping the band to the outside surface of said flanged element, an adjustable screw bolt attached to one end of the band and mounted on the carrier at an angle to the line of strain of the band, and a platform on the carrier arranged to support the end of the bolt so as to resist any radially inward movement of said end.

4. The combination in a band friction clutch, of a carrier, a band, a flanged element carrying said band upon its outside surface, a bracket on the carrier, a screw bolt mounted on the bracket and connected to one end of the band, a platform placed to resist inward movement of the end of the band when the latter is clamped to the flanged element, with a lever pivoted to said bracket and connected to the second end of the band, for causing the latter to be clamped to the flanged element.

5. The combination in a band friction clutch, of a carrier, a band, blocks on the band, a flanged element, means for clamping the band onto the flange, a bracket on the carrier, a screw bolt mounted in the bearing on the bracket at an angle to the line of strain, nuts for adjusting the bolt, an eye on the bolt coupled to the end of the band, a platform on the bracket upon which rests the eye of the bolt, the angle being so proportioned in respect to the band that as the blocks become worn the bolt can be taken up, the eye of the bolt always retaining the same position in respect to the band, substantially as described.

In testimony whereof, I have signed my name to this specification, in the presence of two subscribing witnesses.

GEORGE E. TITCOMB.

Witnesses:
WILL. A. BARR,
JOS. H. KLEIN.